United States Patent
Pyy

[19]

[11] Patent Number: 5,882,484

[45] Date of Patent: Mar. 16, 1999

[54] CONTINUOUS PROCESS FOR CHARGING AND DISCHARGING A CARBONIZATION FURNACE MOVING IN A CIRCLE AND APPARATUS FOR EMBODYING SAID PROCESS

[75] Inventor: Martti Pyy, Raahe, Finland

[73] Assignee: Pyyn Puuhiili Oy, Raahe, Finland

[21] Appl. No.: 945,914

[22] PCT Filed: May 30, 1996

[86] PCT No.: PCT/FI96/00310

§ 371 Date: Mar. 2, 1998

§ 102(e) Date: Mar. 2, 1998

[87] PCT Pub. No.: WO96/38514

PCT Pub. Date: Dec. 5, 1996

[30] Foreign Application Priority Data

Jun. 2, 1995 [FI] Finland ................................. 952704

[51] Int. Cl.[6] ............................. C10B 1/04; C10B 35/00; C10J 3/30

[52] U.S. Cl. ..................... 202/262; 202/261; 202/259; 202/263; 202/270; 414/187; 414/199; 221/14; 221/41

[58] Field of Search ........................ 202/259, 261, 202/262, 263, 270; 414/187, 199; 201/14, 41

[56] References Cited

U.S. PATENT DOCUMENTS 4,071,414  1/1978  Fidchunov et al. ................. 201/40
4,211,611  7/1980  Bocsanczy et al. ................ 202/262
4,400,125  8/1983  Jensen ................................ 414/187
5,384,015  1/1995  Schöter et al. .................... 202/251

FOREIGN PATENT DOCUMENTS 584441    3/1994   European Pat. Off. .
2604      4/1906   Finland .
wo 94/26842  11/1994  WIPO .

Primary Examiner—Bekir L. Yildirim
Attorney, Agent, or Firm—Rockey, Milnamow & Katz, Ltd.

[57] ABSTRACT

The object of the invention is a continuous method for charging and discharging carbonization furnaces (15) moving in a circle, in which method the charging and the discharging are effected in a closed process mainly simultaneously at the opposite ends of the furnace, and the gases are collected and cleaned. Another object of the invention is an apparatus for implementing the method. The equipment comprises carbonization furnaces (15) moving in a circle, a charging device (11, 14, 32), and a discharging device (18, 19), and at least one gas duct for each furnace, the duct being connected at the one end thereof to the furnace and at the other end to a gas collector. According to the invention, the charging device is docked in a gastight manner to the one end of the furnace by means of a docking device (35), and the discharging device is attached in a gas-tight manner to the other end of the furnace for charging and discharging mainly at the same time.

19 Claims, 5 Drawing Sheets

CONTINUOUS PROCESS FOR CHARGING AND DISCHARGING A CARBONIZATION FURNACE MOVING IN A CIRCLE AND APPARATUS FOR EMBODYING SAID PROCESS

The invention is related to a continuous process for charging and discharging a carbonization furnace moving in a circle and to an apparatus for implementing the process, and more particularly to a method according to the introductory part of Claim 1 and to the equipment according to the introductory part of Claim 6.

The purpose of the invention is to develop an environmentally safe and energy-efficient process which can be used to treat waste dump material mixed with wooden material, such as chips, or with coal or peat in an oxygen-free furnace, i.e., a carbonization furnace. Environmentally safe here means that the process should be closed so that no emissions which contain pollution occur, and that energy consumption is low.

The equipment intended for the process should be simple and easy to construct. Another goal is to provide an equipment that is easy to move and can thus be directly connected to a process wherever carbonization of waste is needed.

Dry distillation, i.e., oxygen-free carbonization of carbonous material is a method which has been long known. However, no methods are known which are closed and economically profitable at present.

The Finnish patent no. 2604 from 1906 discloses a continuous carbonization method of split logs and other organic substances and an equipment to implement it. Carbonization retorts move in an annular furnace the space of which is divided into a preheating section, a combustion section, and a cooling section. The material to be carbonized and the generated gases move in opposite directions to recover the heat of the gases. Each retorter is connected, through a duct on the upper cover, to a rotating gas collector from which the gases rise into a central upward duct, and the condensates are removed through a central downward duct. The gas is returned to the burner of the furnace. Gases are removed to the outer air through a pipe.

To discharge and charge the retorter, the wall of the annular furnace is provided with an opening next to which the retorter is turned around a horisontal axis and emptied and recharged with new wooden material.

In this device, the thermal energy of the gases is recovered with the gases and retorters moving according to the counterflow principle, while the discharging and charging of the retorters are carried out manually and with no protection at all. A lot of thermal energy is lost with the discharged mass of coke and gases are spread into the environment at the same time. To be recharged, the retorter is turned back to the upright position and filled with new material, and the residual gas in the retorter is pushed out, dissipating into the open air.

The purpose of the present invention is to provide a method with a lower energy consumption, with no emissions, and with a more effective implementation than the known method described above. The purpose of the invention is also to provide an equipment which can be used to implement such a method and whose operation can be automated.

This has been embodied in a method according to the invention the main features of which are disclosed in the characterizing part of Claim 1, and with an equipment according to the invention the main features of which are disclosed in the characterizing part of Claim 7.

The method according to the invention is thus characterized in that the operation and the charging and discharging of the furnaces that move in a circle are carried out in a closed process, that the charging and discharging are carried out simultaneously at the opposite ends of the furnace, and that the gases are collected and cleaned. Since the process is closed, neither polluting gases nor thermal energy together with them are emitted into the environment. The heat content of the gases can be used in the process and the gases are collected and washed when being removed from the process.

The charging stage is preferably carried out at a pressure higher than the pressure in the furnace, whereby the coking gas or nitrogen gas generated in the process is used for the pressurization.

The heat released at the discharge of the furnace can be used by directing the discharging gases upwards through the channels formed in the subsequent charge to preheat the charge. Released heat can also be used to preheat the charge charged the latest by conducting discharging gases aside and from there to the adjacent furnace that is preceding in the direction of the process.

Discharged gases can also be recycled through the discharge mass and a heat recovery unit. Exited gases can be cooled and washed before the gas collector and cleaned after the gas collector.

The equipment according to the invention for implementing the method is characterized in that both the charging and the discharging devices are provided with a docking device, and that the charging and the discharging devices can be docked, by using these docking devices, simultaneously at the opposite ends of a selected one of the rotating furnaces for simultaneous charging and discharging of the furnace. The charging device is preferably docked at the upper end of the upright furnace and the discharge device at the lower end, correspondingly.

The charging and the discharging devices are preferably connected to the same device body through which the annular rail that rotates the furnaces is adapted to run, so that each furnace can be simultaneously docked to the charging device and the discharging device when the furnace arrives at the docking device.

The charging device is preferably comprised of a container provided with an outer jacket closed by a cover at the top and open at the bottom for being connected to the upper part of the furnace. The upper part of the jacket is provided with a gas-tight feed opening for the charging mass, which preferably is a feed screw leading to the opening. The jacket comprises a pressurizing aggregate for providing the pressurizing pressure in the container. The outer jacket has a docking device attached thereto by means of which the jacket is docked to the upper edge of the furnace in a gas-tight way. The outer jacket is provided, at the inside thereof, with a charging case that receives the charging mass and can be lowered inside the furnace and lifted from it and the bottom of which can be opened and closed.

The lowering and lifting movements of the charging case are preferably carried out by using a member fitted in the cover of the charging container. The charging case is preferably provided with a compression cover of a size corresponding to the inner crossection area of the charging case and adapted to be lifted and lowered by using the members fitted in the cover of the charging container. The purpose of the compression cover is, on the one hand, to compress and smooth out the charging mass during the filling stage and, on the other hand, to retain the charging mass inside the furnace while the charging case is removed from the furnace.

The bottom of the charging case is opened simultaneously with the charging case ascending from the furnace so that the mass remains in the furnace. The opening and closing movements of the bottom are preferably controlled by hydraulic steering arms. An axial shield is provided around the steering arms to prevent the charging mass from entering the space of the steering arm and to simultaneously provide a channel in the charging mass along which the discharging gases can ascend through the mass.

The docking device of the charging device is preferably provided with pressure-controlled seals which are used to connect the docking device in a gas-tight way to the outer jacket of the charging container, on the one hand, and, on the other hand, to the upper edge of the furnace.

The upper cover of the carbonization furnace can be offset for the time of the charging by means of a carrier preferably moving in the horizontal plain. The bottom of the carbonization furnace can be opened fully or only slightly by using preferably hydraulic members. The cover is opened for charging when the charging device has been docked to the furnace and the bottom is fully opened when the lower end of the charging case has reached the upper end of the furnace. The bottom is closed when the coked mass has removed from the furnace and the lifting of the charging case lowered into the furnace is started and its bottom opened. Upon completing the charging stage, the furnace cover is closed. The bottom of the furnace is opened slightly when the adjacent, subsequent furnace is being discharged and its gases are directed to the side and, via a slot at the bottom, upwards through the channels in the charging mass.

The discharging device preferably comprises a receiver that can be docked to the lower end of the furnace, and a horizontally adjacent second container that communicates internally with the receiver and, at the upper part thereof, with the furnace preceding in the direction of the process and adjacent to the furnace to be discharged and charged. The outer wall of the adjacent container is upwardly and outwardly inclined and is thus able to direct the gases discharged from the furnace to the adjacent furnace above, in which they preheat the charging mass.

The discharging device preferably has a gas circulating device connected thereto, comprising tow chambers, the discharge mass being cooled by the gases in the first chamber, and the heat of the gases being recovered in the second chamber. The circulating device communicates with the furnace preceding in the direction of the process and adjacent to the furnace freshly charged, in which is preheats the charging mass.

The receiver preferably communicates with a compartment feeder and an extinguishing chamber connected thereto. Gases circulate via the extinguishing chamber and a heat recovery cell connected thereto. The gas collector preferably has a spare valve connected thereto, burning gas to decrease excess pressure.

The waste treatment method according to the invention in which the waste, such as rubbish depository waste, is carbonized when mixed with wooden material such as chips, with coal or with peat, is environmentally safe and energy-efficient. The process is closed and no emission is released to the open air, and the heat generated in the process is used in the process.

The gas obtained from the carbonization can be burned in the process of its own or in an external process. The carbonization yield can be used as thermal energy in heating plants, for example. The discharged thermal energy is used to preheat the furnace last charged.

The process is continuous; therefore, the time spend for heating when empty is eliminated. Due to the continuous operation of the process, the equipment can be automated to a great extent.

The structure and device solutions of the equipment can be carried out as light-weight and easy-to-build structures as compared with current structures. The equipment can be placed in an integral, thermally insulated case, whereby it can be constructed in connection to or transported into connection with heating stations or rubbish depositories. Thus, the equipment can be connected directly to the process using it.

The method and equipment according to the invention can be used in the treatment of polluted earth, waste, and waste comprising metal, in the coking of mineral coal, and in the manufacture of charcoal.

In the following, the method and the equipment according to the invention are described in detail in the form of preferred embodiments and with reference to the appended drawings in which:

DETAILED DESCRIPTION OF THE INVENTION

Figure 1:
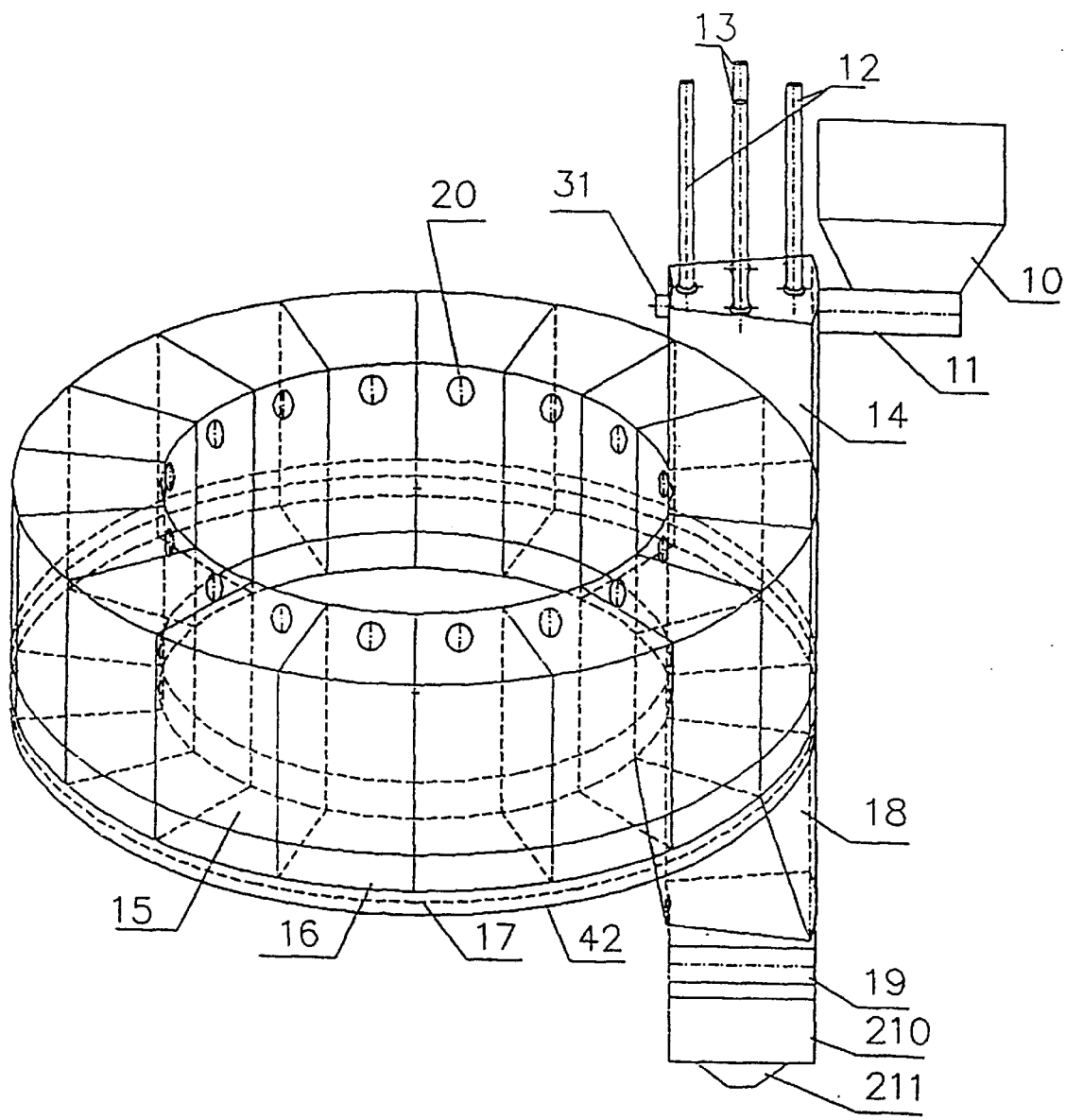
FIG. 1 is a perspective view of the equipment in a skeleton form.

FIG. 1 shows the circle comprised of furnaces 15 and the related docking device comprising, above the row of furnaces, a charging container 14, and a storage bin 10 with a charging screw 11 which feed the charging mass and, under the row of furnaces, a receiving hopper 18 and a compartment feeder 19 that is connected thereto. The receiving hopper 18 is integrated with the circle formed by the furnaces while the charging container 14 is attached by docking to the upper part of the furnace that is being charged and discharged.

Waste material mixed with chips, for example, is fed to a storage tank 10 from where it moves in a gas-tight manner to the charging container 14, fed by a charging screw 11. When a furnace in which the carbonization of the mass has ended comes to the docking device, the charging device 14 is docked to the upper part of the furnace. The finished mass is discharged to the hopper and a fresh mass is charged to the furnace where carbonization occurs while the furnace rotates along its circular orbit. The finished mass moves from the hopper 18 to the compartment feeder 19 and further to an extinguishing chamber 210, FIGS. 2 and 5. Hydraulic members 12 lift and lower the cover 30 of a charging case 32 inside the charging container, and hydraulic members 13 lift and lower the charging case during the charging stage of the furnace, FIGS. 2 and 5. The charging and the discharging of the furnace are effected when the charging container is gas-tightly docked to the upper part of the furnace and when the receiving hopper 18 is gas-tightly attached to the lower part of the furnace. After the rotation, gases exit through ducts 20 to a gas collector 47, FIG. 6.

In the following, the different units of the equipment are described separately.

Figure 2:
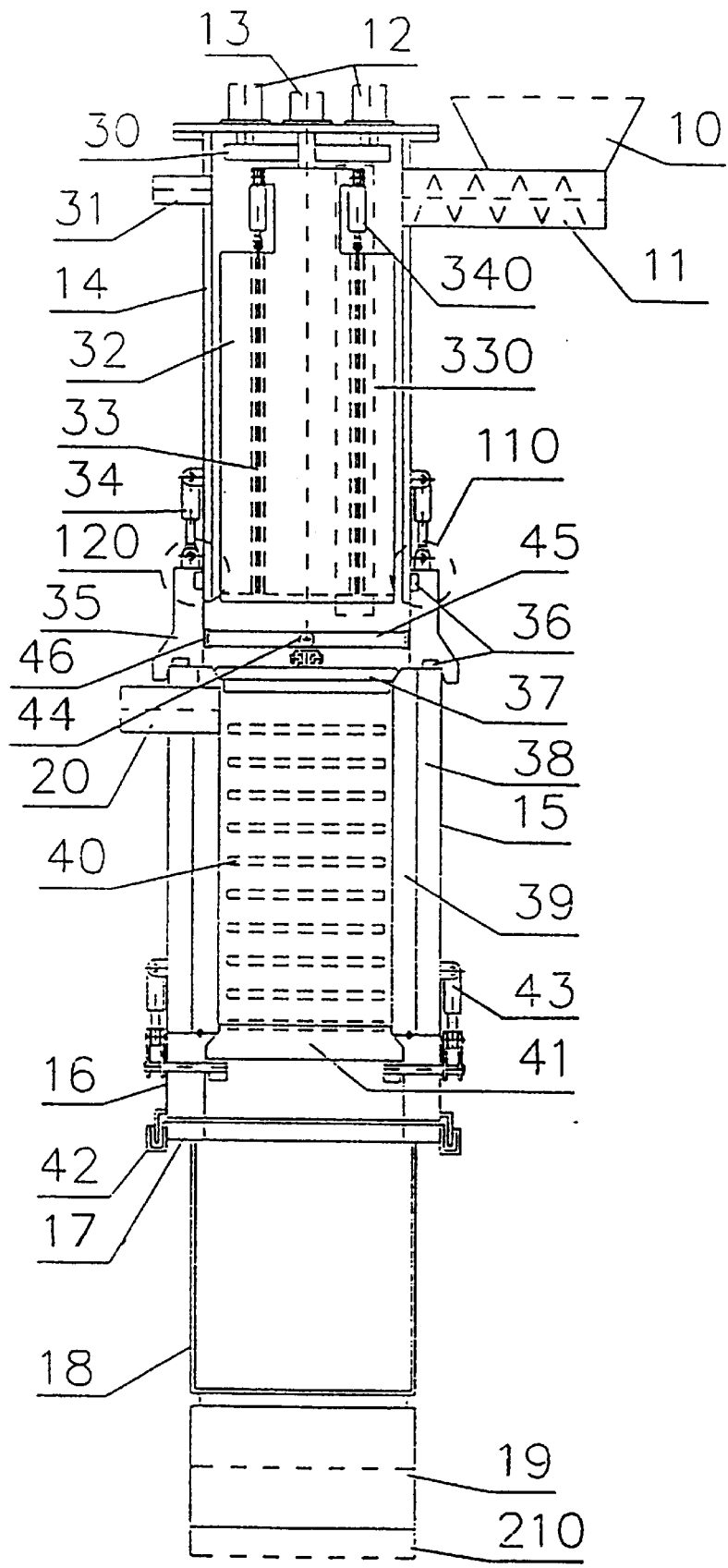
FIG. 2 is a section of the equipment in FIG. 1 as viewed from the side (in the peripheral direction of the circular furnace)

FIG. 2 shows furnaces 15 which are placed in a circle dimensioned according to the number and dimension of the furnaces. The furnaces rotate at a speed determined by the process so that the carbonization of the mass is completed during one cycle. The furnaces are closed and thermally insulated inside a common cylinder case.

Inside the outer jacket of furnace 15, a thermal insulation 38 is provided that withstands high temperatures, such as 1500° C., inside of which there is provided a refractory lining 39 of the furnace. The lining can be cast from refractory material or it can be ceramic. Heating elements 40 for heating the furnace are installed inside the lining. These elements are operated by electricity or gas.

The furnace 15 is closed at the top by a thermally insulated, gas-tight cover 37 which, in the charging stage, is lifted by using a gripping device in a transfer carrier 45 and is moved to the cover chamber adjacent to the furnace by means of a transfer cylinder 44. The transfer carrier moves along guide bars 46.

The furnace 15 is closed at the bottom by means of hydraulic discharge doors 41. A gas outlet 20 is connected to the upper part of the furnace.

The charging device comprises a charging container 14 which is covered by a cover at its upper end and is open at its lower end. The charging screw 11 opens to the upper part of the outer jacket of the charging container, the charging mass being fed to the screw from a storage container 10. The charging screw dosages and compresses the charging material, and the compression cover 30, lifted and lowered by cylinders 12, compresses and smooths out the material. A pressurization aggregate 31 opens to the upper part of the outer jacket, opposite the charging screw 11, and gas such as coke gas or nitrogen is fed from the pressurization aggregate to pressurize the charging device so that the pressure inside it is higher than the pressure in the furnace.

Figure 4:
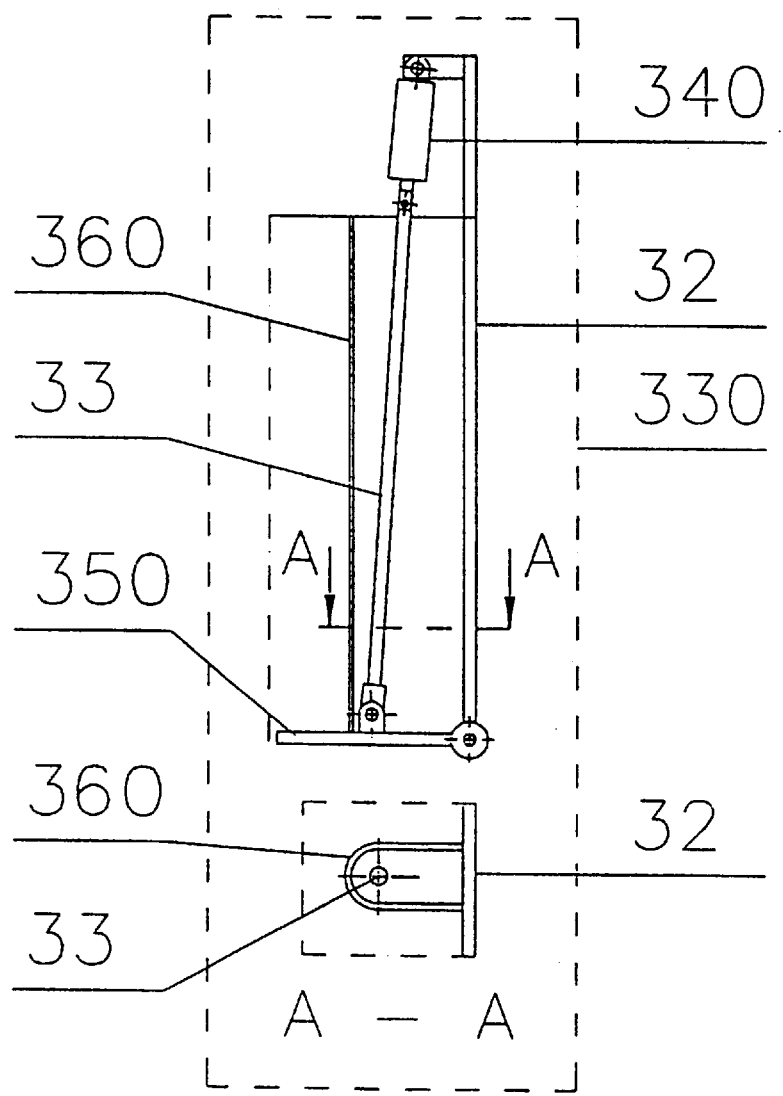
FIG. 4 is an enlarged view of detail 330 of FIG. 2, illustrating the control system of the charging case bottom.

An axially moving charging case 32 is provided inside the charging container 14, the bottom of the charging case being closed by a bottom door 350 during the filling of the case, FIG. 4. The charging case is lifted and lowered by the cylinders 13. The bottom door 350 is hinged to charging case 32 and it is opened and closed by means of a cylinder 340 and steering arms 33. An axially-extending shield 360 is provided around steering arms 33, preventing the charged material from entering the space of the steering arms and allowing undisturbed operation of the steering arms. The steering arm shield leaves a gas run channel in the coked material.

A docking device is attached to the lower part of the charging container, to the outer jacket thereof, the docking device comprising a connecting ring 35 that is gas-tightly fastened to the outer jacket and to the upper edge of the furnace, and a cylinder 34 that lifts the connecting ring, the cylinder being attached, at its upper end to the outer jacket of the charging container in an articulated manner and, at the lower end thereof, to the upper edge of the connecting ring in an articulated manner.

Figure 3:
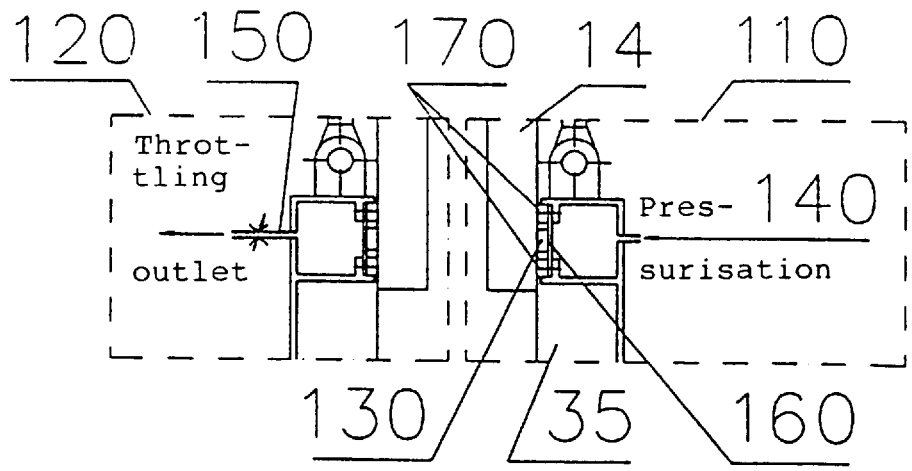
FIG. 3 is an enlarged view of detail 110 in FIG. 2, illustrating the sealing of the docking device of the charging device into the charging pan.

The gas-tight fastening of the connecting ring to the outer jacket and to the furnace is effected by using pressurized seals, FIG. 3. Upon lowering the connecting ring 35 to the lower position by cylinders 34, the seal 36 can be pressurized through the pressurization aggregate 140 by air, gas or fluid. The sealing pressure and cooling effect of the packing material can be adjusted by throttling outlet unit 150.

When the seal 36 is pressurized, the elastic packing material 160 is pressed towards the lower part of the charging device body 14, pressing the sealing tape 130 against it. When the connecting ring 35 is moved by means of the cylinders 34, the seal is not pressurized and the connecting ring is guided against the lower part of the charging device body by means of the wearing strip 170. Similarly, the connecting ring is compressed, in its lower position, against the upper part of furnace 15.

The discharging device comprises a receiving hopper 18 that is attached to a selaing ring 17 at the lower end of the furnace, the sealing ring being connected to the sealing and closing ring 16 by means of a liquid seal 42. The lower part of the receiving hopper is provided with a seal and a compartment feeder 19 gas tightly connected thereto. The compartment feeder is in gas-tight connection with the extinguishing chamber 210 to which the coked material is discharged, FIG. 5. In the extinguishing chamber, the material is extinguished, i.e., cooled, by recycling gas G2 through the chamber and cooling/heat recovery cell 230 along the outlet 240 and return pipe 220. For excess pressure, the outlet 240 is connected to chamber 18 by means of a safety valve 250 and a duct 260.

Figure 6:
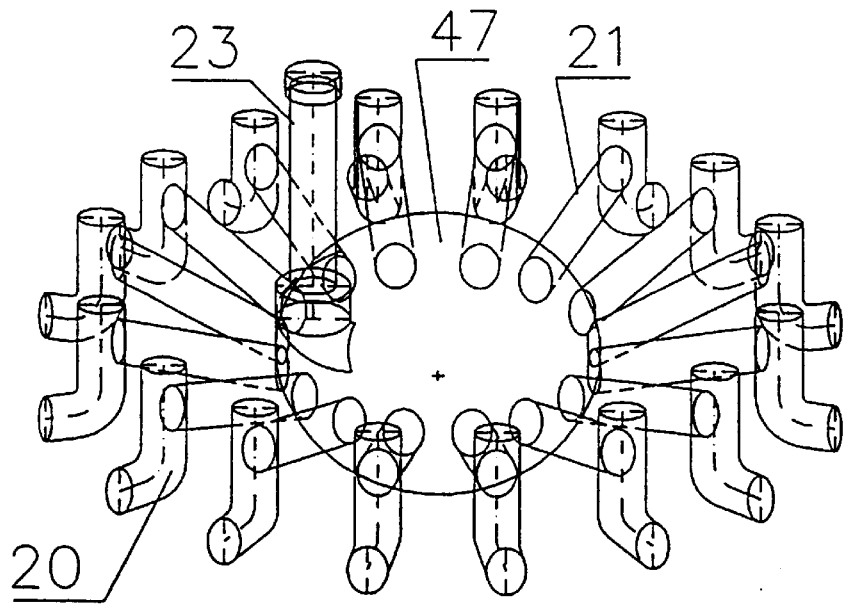
FIG. 6 illustrates a perspective view of the gas outlet system.

The gas collecting pipework is illustrated in FIG. 6. The gas outlet 20 from each furnace is connected, through an intermediate duct 21, to a gas collector ring 22 or, alternatively, to a gas collector sphere 47, according to FIG. 6. Gas is conducted from the gas collector ring or sphere to gas cleaning. Cleaning and cooling of the gas is performed in an intermediate duct 21.

Figure 7:
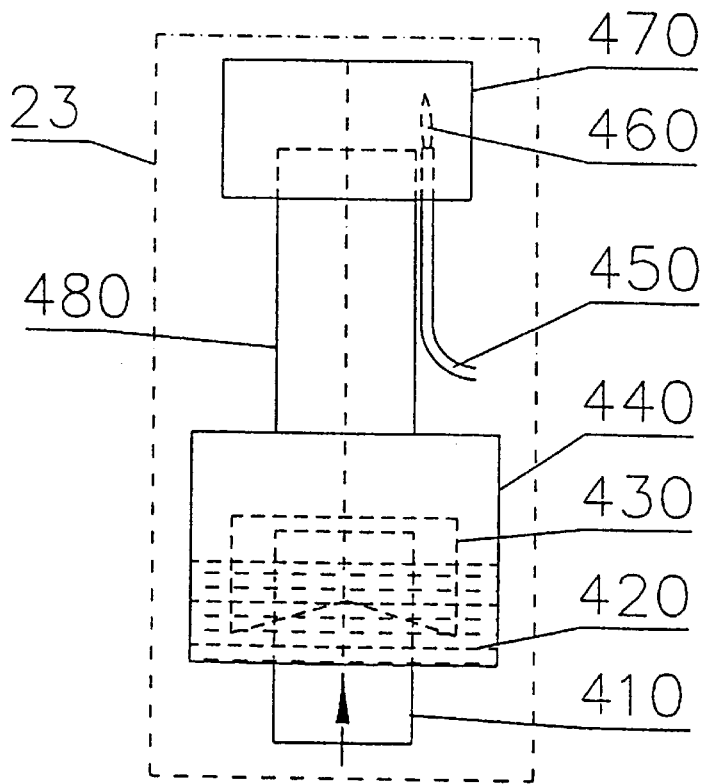
FIG. 7 is an enlarged view of detail 23 of FIG. 6, illustrating a degassing device.

A gas burner 23, shown in FIG. 7, is connected to the gas collector ring or sphere and functions as a spare valve. Gas flows from the gas collector through unit 410 to below a pressure valve 430 situated in the valve chamber 440 of the gas burner. The opening pressure of the pressure valve is adjusted by altering the weight of the pressure valve or, for example, by using auxiliary springs. Fluid 420 serves as a sealing material of the pressure valve. When the pressure valve is opened, the overpressurized gas flows through unit 480 to shield 470 in which it is burned by a support flame.

The apparatus according to the invention functions in the following way:

The charging case 32 is filled from a storage bin 10 by using means of the charging screw 11. The charging screw functions as the measurer of the charging material and as an outward seal of the charging device. Material is fed to the charging case by the charging screw and it is compressed and smoothed out by means of the compression cover 30 driven by cylinders. To obtain a homogenous charge, the cover is used several times when necessary.

The rotating furnace ring is stopped at a furnace where the carbonization, i.e., coking, has been completed. The stopping is effected, for example, by means of a controlling inductive limit switch and the furnace is connected to the charging device body 14 by means of the connecting ring 35. The connecting ring is lifted and lowered by the cylinders 34. When the connecting ring has been lowered to the lower position, its seal 36 can be pressurized. The sealing of the connecting ring to the outer jacket 14 of the charging device and to the upper edge of the furnace is described above.

Upon sealing the charging device to the upper part of the furnace through the connecting ring, the charging device is pressurized by means of the pressurizing duct 31 so that the pressure in the charging device is higher than the pressure in the furnace. Thereafter, the gas-tight cover 37 of the furnace is opened by lifting with the gripping device of the transfer carrier 45 and by transferring it by means of the transfer cylinder 44, to the cover chamber adjacent to the furnace, FIG. 5. The transfer carrier 45 moves along guide bars 46.

Thereafter, the charging case 32 with its charge is lowered to the furnace by means of the cylinder 13. When the lower end of the charging device has reached the upper end of the furnace, the discharge door 41 of the furnace is opened by means of the hydraulic cylinder 43, and the coked material falls into the receiving hopper 18.

During the charging stage, hot coking gases G1 pass from the hopper to the adjacent furnace 15b, which is preceding in the direction of the process, via the opening 17b in the sealing ring 17 of the furnace and the discharge door 41b that is only slightly open, through the furnace 15b and further via the unit 20b to the gas collector pipework. The discharge door 41c of the furnace 15c, which is next preceding furnace in the direction of the process, is closed and the furnace 15c is in the coking stage.

Figure 5:
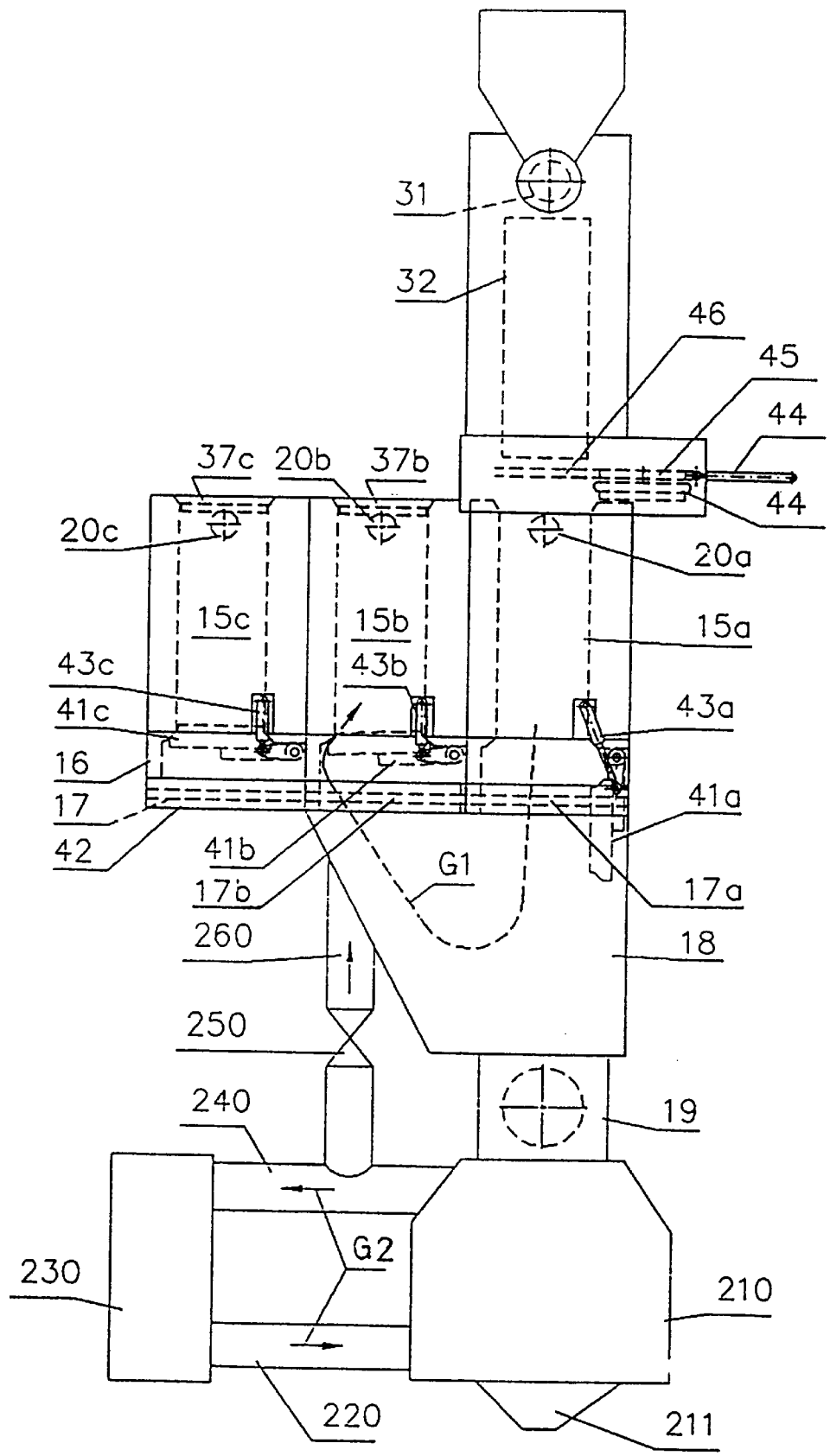
FIG. 5 is a skeleton view of the equipment in a vertical section, from the front, and in a partial section (the Figure shows three adjacent furnaces)

Gases G1 are allowed to flow through furnace 15b thanks to the channels formed by the shields 360 of the steering arms 33 into the coked material. The passing of gases aside to the adjacent furnace is made possible by the form of the hopper which, as viewed from the front in FIG. 5, is upwardly widening and comprises also opening 17b of the adjacent furnace. As the charging case 32 is lowering into the furnace to be charged, hot gas is again passed to the adjacent furnace preheating the fresh charge.

In this way, energy is saved and discharge dust is prevented from exiting from the closed process.

When the charging case 32 is in its lower position, the discharge door 41 is closed and the lifting of the charging case is started while simultaneously opening the bottom door 350 of the charging case. The charge remains in the furnace because the compression cover 30 is not lifted but it keeps the charge in place. After lifting of the compression cover, the furnace cover is closed, and the furnace is released from the docking device and the furnace is subjected to the heating cycle.

The charging case 32 is charged with fresh charging material and it is then ready to charge the next furnace.

The coked mass which has fallen into the discharge hopper moves to compartment feeder 19 which discharges the material into the extinguishing chamber 210. In the extinguishing chamber, the material is extinguished, i.e., cooled by the recycling gas G2 via the chamber and cooling/heat recovery cell 230 along the outlet pipe 240 and the return pipe 220. Possible excess pressure is discharged from the outlet pipe to the chamber 18 via the pressure valve 250 and the duct 260. The extinguished material is dropped, through hopper 211 for further processing.

The gas generated in each furnace is transferred via the gas outlet pipe 20 and the intermediate duct 21 to the gas collector sphere 47 from where gas is conducted to gas cleaning. The gas is cleaned and cooled in the intermediate duct 21. From the gas collector the gas flows through unit 410 to below the pressure valve 430 in the valve chamber 440 of the gas burner. The opening pressure of the pressure valve is adjusted by altering the weight of the pressure valve or by using auxiliary springs. The pressure valve should open before the pressure in the furnace increases so much that cover 37 is opened. Fluid 420 serves as the compressing material of the pressure valve. When the pressure valve opens, overpressurized gas flows through unit 480 to shield 470 where it is burned by a support flame.

Coking of the coke material is thus continuously taking place in all the furnaces, the process being in different stages in each furnace. Fresh charging material is added through the feeding screw to the charging case as a case is emptied into the furnace. Discharged, coked mass is continuously extinguished in the extinguishing chamber and emptied from it as new coked material is discharged from the furnace. Gases are continuously recovered and cleaned, and possibly subjected to a new cycle in the process as the pressurizing gas of the charging case. The process is continuous and closed and the equipment designed to implement the process is easy to automate.

The method and the equipment according to the invention can be modified according to different needs within the following claims. The furnaces can, for example, be constructed as separate units which are surrounded by respective insulation jackets and which rotate in a circle. In this case, charge materials requiring different temperatures can be handled in different furnaces.

I claim:

1. A continuous method for charging and discharging carbonization furnaces moving in a circle, characterized in that the operation of the carbonization furnaces and the charging and discharging are carried out mainly simultaneously at the opposite ends of the furnace, and that the generated gases are collected and cleaned.

2. A method according to claim 1, characterized in that the charging is carried out under pressure.

3. A method according to claim 1 or 2, characterized in that heat released in the discharging is used to preheat a subsequent charge by directing the generated gases upwards through channels formed in the charge.

4. A method according to of claim 1 or 2, characterized in that heat released in the discharging is used to preheat a mass charged last by directing the generated gases aside and upwards to preheat the charge of a adjacent furnace that is preceding in the direction of the process.

5. A method according to claim 4, characterized in that gases are recycled through a discharging mass and a heat recovery device.

6. A method according to claim 4, characterized in that gases are cooled and washed before a gas collector and are cleaned after the gas collector.

7. Apparatus for implementing the method according to claim 1, comprising carbonizing furnaces moving in a circle, a charging device, a discharging device, and at least one gas duct for each furnace, the duct being connected at the one end thereof to an upper part of a furnace and at the other end to a common gas collector, characterized in that the charging device and the discharging device are connected in a gas-tight manner to opposite ends of one furnace for a mainly simultaneous charging and discharging of the furnace, the charging device being connected to an upper end of the furnace and the discharging device to a lower end, respectively.

8. Apparatus according to claim 7, characterized in that the charging device and the discharging device are connected to a device body, the circle along which the furnaces are rotating being adapted to pass through the device body so that each furnace can be simultaneously docked to the charging device and to the discharging device.

9. Apparatus according to claim 7 or 8, characterized in that the charging device comprises a charging container comprising an outer jacket, which is closed by a cover at a top thereof and is open at a bottom, an upper part of the outer jacket having a gas-tight feed opening for a charging mass, and further comprising a feeding screw that leads to the feed opening, and a pressurizing aggregate to pressurize the charging container, that a docking device is attached to the outer jacket, by means of which docking device the outer jacket is docked to the upper part of the carbonization furnace in a gas-tight manner, and that the charging device comprises a charging case for receiving the charging mass, the charging case being adapted to be lowered inside the furnace and lifted from it and comprising a bottom that can be opened and closed.

10. Apparatus according to claim 9, characterized in that the lowering and lifting movements of the charging case are carried out by a means attached to the cover of the charging container.

11. Apparatus according to claim 9, characterized in that a compression cover is fitted above the charging case, which cover can be axially moved regardless of the movements of the charging case, to compress and retain the charging mass.

12. Apparatus according to claim 9, characterized in that a bottom of the charging case is openable by means of hydraulic steering arms and that an axial shield is provided around the steering arms, preventing the charging mass from entering the space of the steering arms.

13. Apparatus according to claim 9, characterized in that the docking device of the charging device comprises pressure-controlled seals to provide a gas-tight docking between the docking device and the outer jacket of the charging device and between the docking device and an upper edge of the furnace.

14. Apparatus according to claim 7, characterized in that an upper cover of the furnace can be moved aside for the time of the charging, by means of a moving carrier.

15. Apparatus according to claim 7, characterized in that a bottom of the furnace is openable fully by means of hydraulic members, for the time of the discharging of the furnace, or only slightly to release gases discharging from below to preheat the mass freshly charged into the furnace.

16. Apparatus according to claim 7, characterized in that the discharging device comprises a receiving container that is attached to the lower end of the furnace in a gas-tight manner and that comprises a part extended in the lateral direction and communicating, at an upper part thereof with a furnace that is adjacent to the one furnace being discharged and charged, and that is preceding in the direction of the process, the outer wall of the container being upwards and outwards inclined to direct the gases discharging from the one furnace to the adjacent furnace to preheat a charging mass in it.

17. Apparatus according to claim 7, characterized in that the discharging device has a gas circulating device connected thereto, comprising a first chamber in which gases cool a discharging mass, and a second chamber which recovers the heat of the gases, and that the circulating device communicates with the furnace that is adjacent to the freshly charged one furnace and preceding in the direction of the process.

18. Apparatus according to claim 17, characterized in that a receiving tank of the discharging device has a compartment feeder with an associated extinguishing chamber connected thereto, and that gas is adapted to circle view the extinguishing chamber and an associated heat recovery cell.

19. Apparatus according to claim 7, characterized in that the gas collector has a gas burner connected thereto.

* * * * *